United States Patent
Benke et al.

(10) Patent No.: US 9,953,293 B2
(45) Date of Patent: *Apr. 24, 2018

(54) METHOD FOR CONTROLLING CHANGES OF REPLICATION DIRECTIONS IN A MULTI-SITE DISASTER RECOVERY ENVIRONMENT FOR HIGH AVAILABLE APPLICATION

(75) Inventors: Oliver Benke, Leinfelden-Echterdingen (DE); Bernd Jostmeyer, Boeblingen (DE); Thomas Lumpp, Reutlingen (DE); Markus Mueller, Eutingen (DE); Martin Reitz, Dettingen (DE); Wolfgang Schaeberle, Nufringen (DE); Walter Schueppen, Boeblingen (DE); Isabell Schwertle, Metzingen (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 289 days.

This patent is subject to a terminal disclaimer.

(21) Appl. No.: 13/527,692

(22) Filed: Jun. 20, 2012

(65) Prior Publication Data
US 2012/0260128 A1 Oct. 11, 2012

Related U.S. Application Data

(63) Continuation of application No. 13/098,256, filed on Apr. 29, 2011.

(30) Foreign Application Priority Data

Apr. 30, 2010 (EP) .................................. 10161639

(51) Int. Cl.
G06F 17/30 (2006.01)
G06Q 10/10 (2012.01)
G06F 11/20 (2006.01)

(52) U.S. Cl.
CPC ......... G06Q 10/10 (2013.01); G06F 11/2023 (2013.01); G06F 11/2038 (2013.01); G06F 11/2097 (2013.01)

(58) Field of Classification Search
CPC ........... G06F 17/30575; G06F 11/2082; G06F 11/1451; G06F 11/1469; G06F 11/2048; G06F 17/30212
(Continued)

(56) References Cited

U.S. PATENT DOCUMENTS 4,627,018 A 12/1986 Trost et al.
7,024,528 B2 4/2006 LeCrone et al.
(Continued)

OTHER PUBLICATIONS

Engelmann et al., "Concepts for High Availability in Scientific High-End Computing," Laboratory Directed Research and Development Program—Oak Ridge National Lab, 2005 (7 pages).
(Continued)

*Primary Examiner* — Syling Yen
*Assistant Examiner* — Bao Tran
(74) *Attorney, Agent, or Firm* — Griffiths & Seaton PLLC

(57) ABSTRACT

A running of an application resource of a first site of at least two sites is stopped from accessing a storage device of the first site. A running of a replication resource is brought to a stop. The replication resource is configured to control a replication of data between the storage device on the first site on which data from the running application resource on the first site are stored to the storage device on the second site. A replication request is submitted to the automation engine for changing a replication direction to run from the second site to the first site. The application resource is started on the second site only after changing the replication direction to start from the storage device on the second site instead of from the storage device of the first site.

17 Claims, 6 Drawing Sheets

(58) Field of Classification Search
USPC .......................................... 707/636; 711/156
See application file for complete search history.

(56) References Cited

U.S. PATENT DOCUMENTS

| | | | |
|---|---|---|---|
| 7,065,620 B2 | 6/2006 | Ballard et al. | |
| 7,100,083 B2 | 8/2006 | Little et al. | |
| 7,185,228 B2* | 2/2007 | Achiwa | G06F 11/2058 707/999.202 |
| 7,321,992 B1 | 1/2008 | Vellore et al. | |
| 7,392,421 B1 | 6/2008 | Bloomstein et al. | |
| 7,412,479 B2 | 8/2008 | Arendt et al. | |
| 7,607,037 B1 | 10/2009 | LeCrone et al. | |
| 8,112,661 B1 | 2/2012 | La France et al. | |
| 2003/0079154 A1 | 4/2003 | Park et al. | |
| 2003/0236738 A1* | 12/2003 | Lange | G06Q 30/08 705/37 |
| 2004/0039888 A1 | 2/2004 | LeCrone | |
| 2004/0158766 A1* | 8/2004 | Liccione et al. | 714/4 |
| 2007/0226277 A1* | 9/2007 | Holenstein et al. | 707/204 |
| 2007/0294493 A1* | 12/2007 | Buah et al. | 711/156 |
| 2008/0126793 A1 | 5/2008 | Jostmeyer et al. | |
| 2009/0006888 A1* | 1/2009 | Bernhard | G06F 11/08 714/6.12 |
| 2009/0049054 A1* | 2/2009 | Wong | G06F 11/2097 |
| 2009/0276657 A1 | 11/2009 | Wetmore et al. | |
| 2010/0228819 A1* | 9/2010 | Wei | G06F 9/505 709/203 |
| 2011/0078494 A1* | 3/2011 | Maki et al. | 714/6.12 |

OTHER PUBLICATIONS

Engelmann et al., "Symmetric Active/Active High Availability for High-Performance Computing System Services," Journal of Computers, vol. 1, No. 8, Dec. 2006 (12 pages).

* cited by examiner

METHOD FOR CONTROLLING CHANGES OF REPLICATION DIRECTIONS IN A MULTI-SITE DISASTER RECOVERY ENVIRONMENT FOR HIGH AVAILABLE APPLICATION

PRIORITY CLAIM

This application is a Continuation of U.S. patent application Ser. No. 13/098,256, filed Apr. 29, 2011, which claims priority to European Patent Application No. 10161639.9, filed Apr. 30, 2010.

BACKGROUND OF THE INVENTION

Field of the Invention

This invention relates to a method for processing a disaster recovery setup using a policy-based automation engine controlling at least two sites of a computing environment, a computing environment for the disaster recovery setup and a computer program product containing code portions to process the disaster recovery setup.

Description of Background

Within enterprise computing centers dedicated to support an IT infrastructure, human operators are employed to keep these diverse applications up and running. In order to achieve high levels of availability, software programs—typically called 'automation product'—are used to support the operators. IT infrastructure consists of systems hosting applications and direct access storage devices for saving persistent data required by the applications.

An IT infrastructure which is prepared for disaster scenarios—like a complete power outage of the building hosting this infrastructure—has typically been setup under consideration of the following points:

a) A backup site has been defined and setup. Usually the production is running on a production site (site 1). The production is moved to the backup site only in cases where the production site is not available anymore (site 2);

b) Systems are available on site 2 to host the production applications. Applications are installed and configured ready-to-run on site 2;

c) Data which is required by those applications is available and current on site 2, thus allowing the application to restart on site 2 without losing the complete state of operations they have been in on site 1.

To be prepared for point c) of this described setup, replication techniques have been established to ensure that data written to a storage device on one site 1 is almost instantly copied over (also called "replicated") to site 2.

In these Data Replication (DR) enabled setups it is crucial for application that the required (i) data on the storage device is accessible on the site where the application is running, (ii) replication is enabled and working, and (iii) replication is directed to the opposite site. ii) and iii) are mandatory if the applications are required to be DR enabled at any time.

Data replication can be implemented by different technologies. Some storage devices offer synchronous replication to another storage device of the same type as a build-in service. This kind of data replication is usually identified as "storage-based replication". Other storage devices do not implement this kind of service. For this situation, software solutions do exist and implement the data replication usually on the device driver layer of the operating system to which the storage device is attached.

Typically, the replication direction has to be configured before the replication task itself is started. Whenever it is required to change the replication direction, the following steps are executed:
1. Stop the data replication;
2. Reconfigure replication direction;
3. Start the data replication.

In a functional view, automation product often handles different scenarios where an application and the IT resources must be, for example, stopped, moved or restarted either in planned scenarios for maintenance purposes or unplanned scenarios when failures occur. Used automation products are typically script-based or policy-based. Scripts are often written by a system application programmer or by some system administrator to implement the desired automation support. It is also possible that automation products are policy-based, i.e. they use an abstract configuration description of the application and the IT resources needed to run the application.

As mentioned above, scripts are often written by a system application programmer or by system administrator staff to implement the desired automation support. The drawback of the script-based approach is that any change in hardware, operating system, middleware, data replication technique or application setup results in very labor intensive updates and tests of the automation scripts. Software vendors sell automation products, which typically have to be customized before they can be used to automate IT resources. These vendor automation products are also often script-based. This means that the system administrator staff must write script plugins to implement the desired automation support. Here, the drawbacks are identical to the ones described above.

Other vendor automation product is policy-based. In this context an 'automation policy' is an abstract configuration description of the application in the IT resources needed to run the application. A prior art automation policy typically consists of 'grouping concepts' and of relationships. In comparison to other approaches, the policy-based approach has benefits. It is easy to adapt to changes in hardware, software, operating system, middleware or application setup, because only a few changes in the automation policy definition are needed to reflect a new configuration.

Policy-based automation products typically support the following entities:

A definition of resources with a defined availability state. These resources typically express hardware or software entities.

A grouping concept to aggregate resources for an intuitive, single point of control. Groups also generally have a defined availability state.

A concept for relationships between defined resources and/or groups. Relationships define how the availability state defined for multiple resources will be reached by the automation product.

Relationships are constraints on the automation behavior. Examples of relationships include 'StartAfter', 'StopAfter' and 'ForcedDownBy'. The automation manager respects relationships as part of the policy, so they influence the automation behavior. For example, if a resource gets desired state online that has a StartAfter relationship to another resource, the latter one is started before the former one is started.

Furthermore, automation products can be goal driven or command driven. Goal driven automation means that the automation software knows the automation goal for each resource it manages. Automation goals are typically called requests. There may be multiple competing and possibly conflicting requests on a single resource. Requests have a priority and the request with the highest priority wins and determines the so-called 'desired state' of the resource. Possible desired state values for a resource are for example 'online' or 'offline'. The automation software pursues the winning request of a resource by trying to keep the resource in its desired state. In a command driven automation product, the last issued command against a resource, i.e. start or stop, always wins. This means that there cannot be multiple or competing commands for a resource at a time. The automation product of the present invention is goal driven.

In an event-driven automation product, the automation engine subscribes for events of the managed resources. The managed resources have the obligation to inform the subscribers in case of any status change. Thus, a new automation cycle is triggered either by events being received and/or requests being submitted or removed. Event-driven system automation has the advantage that a permanent re-evaluation is not required, which thus saves valuable computational resources.

The term automation engine or product is used here for software, which automates operator tasks for the purpose of continuous or high available applications even within the scope of a multiple site disaster recovery setup including automated site switches. Applications and their required data, also called resources in this context, are kept highly available and correctly directed by the automation product.

Functions or services delivered by resources as defined above are typically not seen as entities of policy-based automation products. That means generally only the availability state is monitored and ensured by state of the art cluster high availability products. Usually it is not possible to express functional side aspects of such resources.

Looking at the example of data replication, an automation product is normally only able to ensure that a data device is working (available) but it is not checked that it is also currently providing a specific service configuration such as replicating data to another specific site.

With reference to FIG. 1, a software application resource 101 on site 1 is hosted by server 102 and is dependent on the availability of the storage device 103, since the data of resource 101 is written to the storage device 103 via the I/O path 107. On site 2, there is an identical setup with a stopped software application resource 104 that is the backup of software application resource 104 and that is hosted by server 105 and is dependent on the availability of the storage device 106 if it is running.

The requirement for resource 101 is that it must be prepared to restart after a disaster and to continue working within the state it has been at the moment the disaster happened. Therefore, resource 101 has the requirement that data written to the storage device 103 is replicated to site 2. The storage device 103 is configured to replicate all data which is being stored on it to the storage device 106. This replication is setup in one direction only.

In a site failover situation, also called a site switch, the application resource 104 can be started on site 2 and can takeover the work of resource 101 based on the data it loads from storage device 106.

As can be seen from this scenario, it is crucial that the application 101 respectively 104 is only started when:
 a) The data is available and up-to-date on the same site where the application is going to be started;
 b) The replication is targeted to the other site. This makes the data on the storage system accessible at the same site where the application is going to be started.

All other runtime situations would cause the application not to be prepared for a disaster scenario, which would be a violation of the requirements against it.

FIG. 2 shows the setup in a disaster case. The software application resource 205 is now running on server 206 and is accessing the data on the storage device 208 via the I/O path 208. The server 202 is broken, so the software application resource 201 is no longer running and the I/O path 203 is not established. However, the storage device 204 is still available so data can be replicated from storage device 208 to 204.

In order to transition from the state described in FIG. 1 to the state in FIG. 2, a number of manual steps have to be performed. FIG. 3 shows these manual steps. Depending on whether the application on site 1 is running or not, the application has to be stopped (301). The application might not be running if the application has crashed itself and cannot be restarted or the server has crashed. After that, the replication has to be stopped (302) and the direction has to be changed to Site2-Site1. If the data volumes on site 1 are still available, the replication can be started again (304). Finally, the application is started on site 2.

SUMMARY OF THE INVENTION

In view of the above, it is an object of the present invention to alleviate above drawbacks by optimizing a disaster recovery setup. This is advantageously achieved by implementing a method for processing a disaster recovery setup using a policy-based automation engine controlling at least two sites of a computing environment, each site comprising a server with an application resource and a storage device for storing data of the application resource. The resources are defined with corresponding state of availability and relationship rules for constraints between the resources. The computing environment further comprises a replication resource controlling a replication of data between the storage device on which data from the running application resource are stored to the storage device on the other site within the computing environment, the replication resource being defined by an availability state and a replication direction state, both states being updated within the automation engine. The method according to the present invention comprises the following steps:

Defining relationship rules between the replication resource and other resources controlled by the automation engine to perform a change of replication direction only after bringing to a stop the running application resource accessing the storage device, then bringing to a stop the running replication resource and to allow a restart of an application resource on one site only after changing replication direction to start from the storage device to be used by the application resource to a storage device on a second site; and Submitting a replication request to the automation engine for changing the replication direction from one site to another site while the automation engine executes the request taking into account the predefined relationships.

In an advantageous embodiment, the automation engine is goal-driven by prioritizing requests on the resources such that the resource replication request for changing the replication direction is given the highest priority.

In an alternative, the automation engine can be considered event-driven such that it receives events from the controlled resources at a change of status to determine final state of the resources.

In another embodiment according to the invention, a computing environment for a disaster recovery setup comprises at least two sites with a server with an application resource and a storage device for storing data of the application resource, the resources being defined with corresponding state of availability and relationship rules for constraints between the resources. The computing environment further comprises a replication resource controlling a replication of data between the storage device on which data from the running application resource are stored to the storage device on the other site. The replication resource is defined by an availability state and a replication direction state, both states being updated within the automation engine such that the automation engine is aware of actual status. Relationship rules are defined between the replication resource and other resources controlled by the automation engine to perform a change of replication direction only after bringing to a stop the running application resource accessing the storage device, then bringing to a stop the running replication resource and to allow a restart of an application resource on one site only after changing replication direction to start from the storage device to be used by the application resource to a storage device on a second site. The submission to the automation engine of a replication request for changing the replication direction from one site to another site is executing according to the invention by the automation engine taking into account the predefined relationships.

In an advantageous embodiment, the automation engine is goal-driven by prioritizing requests on the resources such that the resource replication request for changing the replication direction is given the highest priority.

In an alternative, the computing environment can be controlled by a policy-based automation engine being event-driven by receiving events from the resources at a change of status to determine final state of the resources.

According to a further aspect of the embodiment, a computer program product is provided for processing a disaster recovery setup using a policy-based automation engine controlling at least two sites of a computing environment with a server with an application resource and a storage device for storing data of the application resource. The computer program product comprises a computer usable medium having computer usable program code embodied therewith. The computer usable program code is configured to perform the steps according to the above method.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
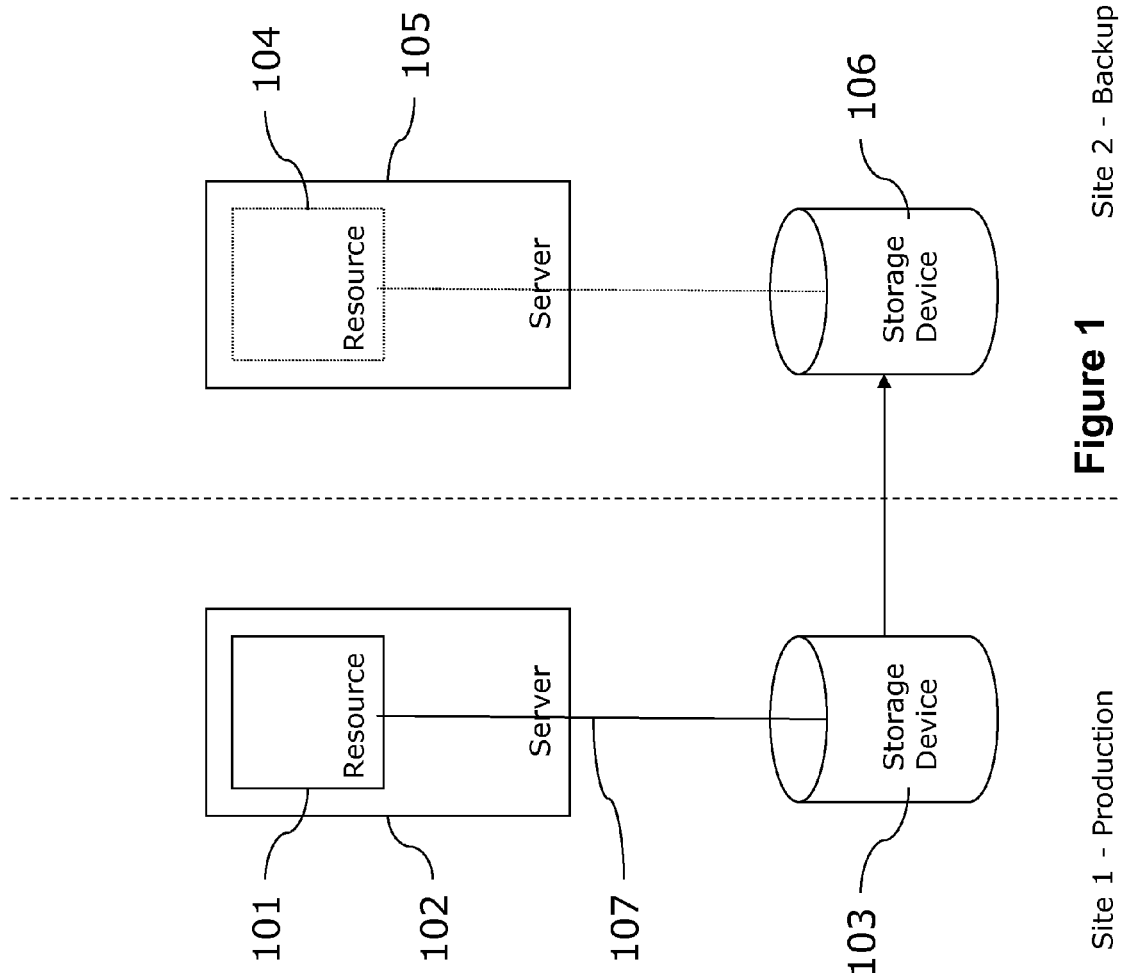
FIG. 1 illustrates a disaster recovery setup according to prior art.

The detailed description explains the preferred embodiments of the invention, together with advantages and features, by way of example with reference to the drawings.

DETAILED DESCRIPTION OF THE INVENTION

In the following, similar elements are depicted by the same reference numerals. In accordance with an embodiment of the invention, FIG. 4 shows a policy for automating site takeovers and FIG. 5 shows the basic workflow that is automated by the automation engine or product.

Figure 4:
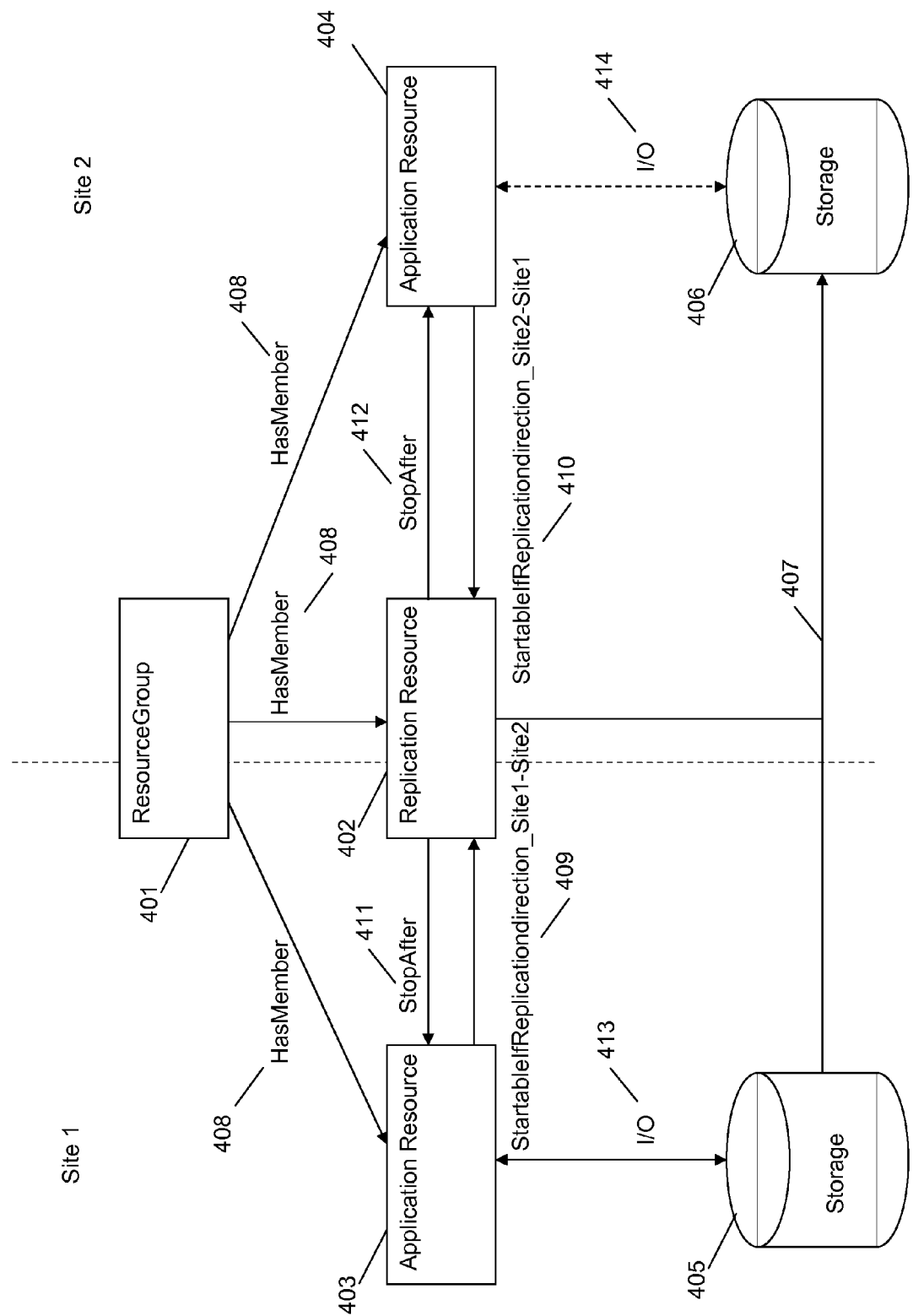
FIG. 4 illustrates one example of an automation engine according to the invention.
Figure 5:
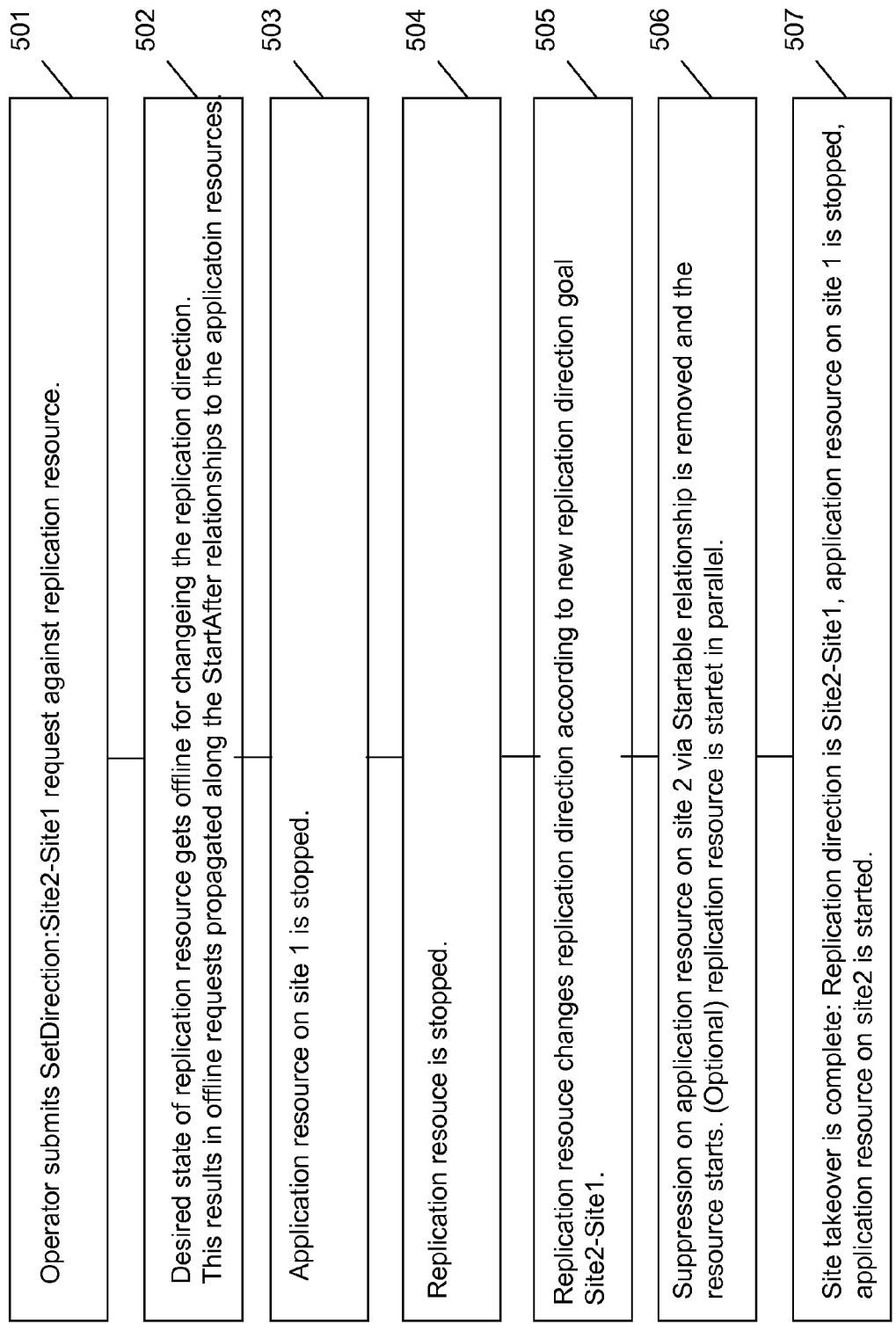
FIG. 5 illustrates a workflow performed by the automation engine to failover the application according to the invention.

FIG. 4 shows a potential policy configuration for automating a disaster-recovery setup according to the invention. It consists of an application (403) accessing storage (405) at site 1 and a backup application (404) accessing storage (406) at backup site 2. The I/O between the applications and the storage can be enabled either on site 1 (413) or on site 2 (414), but never at both sites at the same time. Replication (407) between the storage of site 1 (405) and site 2 (406) is controlled by a replication resource (402). It is the representation of the replication in the automation product. Both applications and the replication resource are organized as members in a resource group (401), illustrated by the HasMember relationships (408).

If the desired state of the resource group is offline, all members are stopped in the order given by the relationships. If the desired state of the resource group is online, the desired state of the members is set to online and as a result they are started according to the relationships.

Relationships between the replication resource and the application resources are used to model and automate the dependencies between the resource group members.

The relationship StartableIfReplicationdirection_Site1-Site2 (409) suppresses the start of application resource at site 1 if the replication resource does not have the replication direction Site1-Site2 set. In the same way, the application resource on site 2 is suppressed by a StartableIfReplicationdirection_Site2-Site1 relationship (410) if the replication resource is not in replication direction Site2-Site1. These two relationships ensure that the application resources are not started unless the correct replication direction is established and the I/O to the corresponding storage device is possible (the storage host is active).

The StopAfter relationships (411 and 412) between the replication resource and the application resources ensure that the replication resource is not stopped before the replication resource and that an offline request is passed to the application resources if the desired state of the replication resource is offline. This avoids the situation that an application writes data to the storage that is not replicated because the replication is stopped before the application is offline (finally affecting the recovery point objective).

Figure 3:
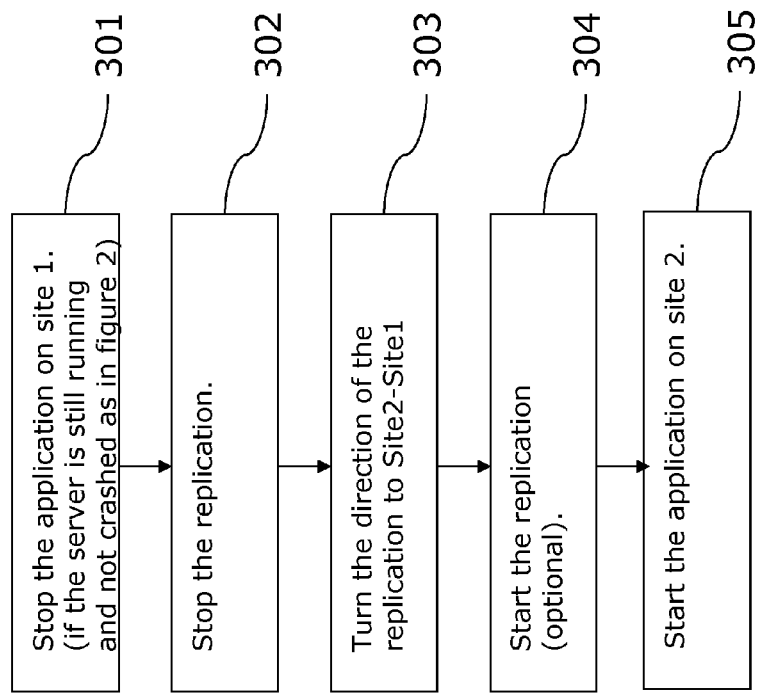
FIG. 3 illustrates a workflow to failover the application resource from site 1 to site 2 in a disaster recovery setup as of FIG. 2.

The workflow depicted in FIG. 3 has to be performed by an operator if the site-takeover is not automated. With the embodiment of the invention and the policy described in FIG. 4, the workflow for a site-takeover is automated and performed by an automation product. This automated workflow is depicted in FIG. 5. Initial setup includes the resource group (401) having desired state online, the application resource at site 1 (403) being online, the replication resource (402) being online with replication direction Site1-Site2. Application resource at site 2 (404) is offline. The operator triggers a site-takeover by submitting a request for setting the replication direction to Site2-Site1 against the replication resource (501). The desired replication direction changes to Site2-Site1, while the observed replication direction is still Site1-Site2, because the switch has not taken place yet. The mismatch of the observed replication direction with the desired replication direction causes the automation product to set the desired state of the replication resource to offline (502).

As a result of the new desired state, offline requests are propagated along the StopAfter relationships (411 and 412) to the application resources (403 and 404). The application resource that is online (403) is stopped by the offline request (503). The stop of the replication resource is inhibited by the StartAfter relationship (411) until the application resource (403) is observed offline. Once application resource (403) is observed offline, the replication resource is stopped (504).

Now all applications and thus I/O, as well as the replication is stopped. The replication direction can be switched, which is done by setting the new replication direction at the replication resource to Site2-Site1, according to the new replication direction goal (505). Further in this step, the offline request on the replication resource is removed since the desired replication direction now matches the observed one. Also, the propagated offline requests on the application resources are removed. Once the replication direction has switched to Site2-Site1, the relationship 409 suppresses the start of application resource at site 1, and the suppression of application resource on site 2 by relationship 410 is removed. As a result, the application resource at site 1 stays offline, while the application resource at site 2 is started (506). The replication resource is started in parallel.

Depending on the type of site outage that is observed at site 1, which was the trigger for the site takeover, the replication might be started or not. The workflow described here is the scenario where the operator decides to start the replication. In the alternative scenario, the operator decides to leave the replication offline. In this scenario, the operator has to submit an offline request on the resource group (401) prior to step 1 (501) and an online request against application resource 404 after step 5 (505). When the application resource at site 2 and the replication resource are online, the automated site-takeover is completed (507).

The method according to the present invention has the advantage that the entire workflow for the site-takeover from site 1 to site 2 is encapsulated in the policy and the nature of the replication resource. An operator can choose to change the site which hosts the available application without having to follow the correct sequence of steps by simply setting the role on the top-level resource group. Whenever applications have a dependency on the availability as well on the replication direction of the storage device used by them the automation product will ensure that these applications are being stopped accordingly and potentially being started on another site. The operator effort for a site-takeover is reduced to submitting a single request against the replication resource setting the replication direction. Because the workflow is automated, the risk of operator errors is reduced significantly. An implementation according to present invention is not restricted to a two-site setup. Also 3- or more site setups can be modeled for automating the site-takeover according to the embodiment of the invention.

Figure 6:
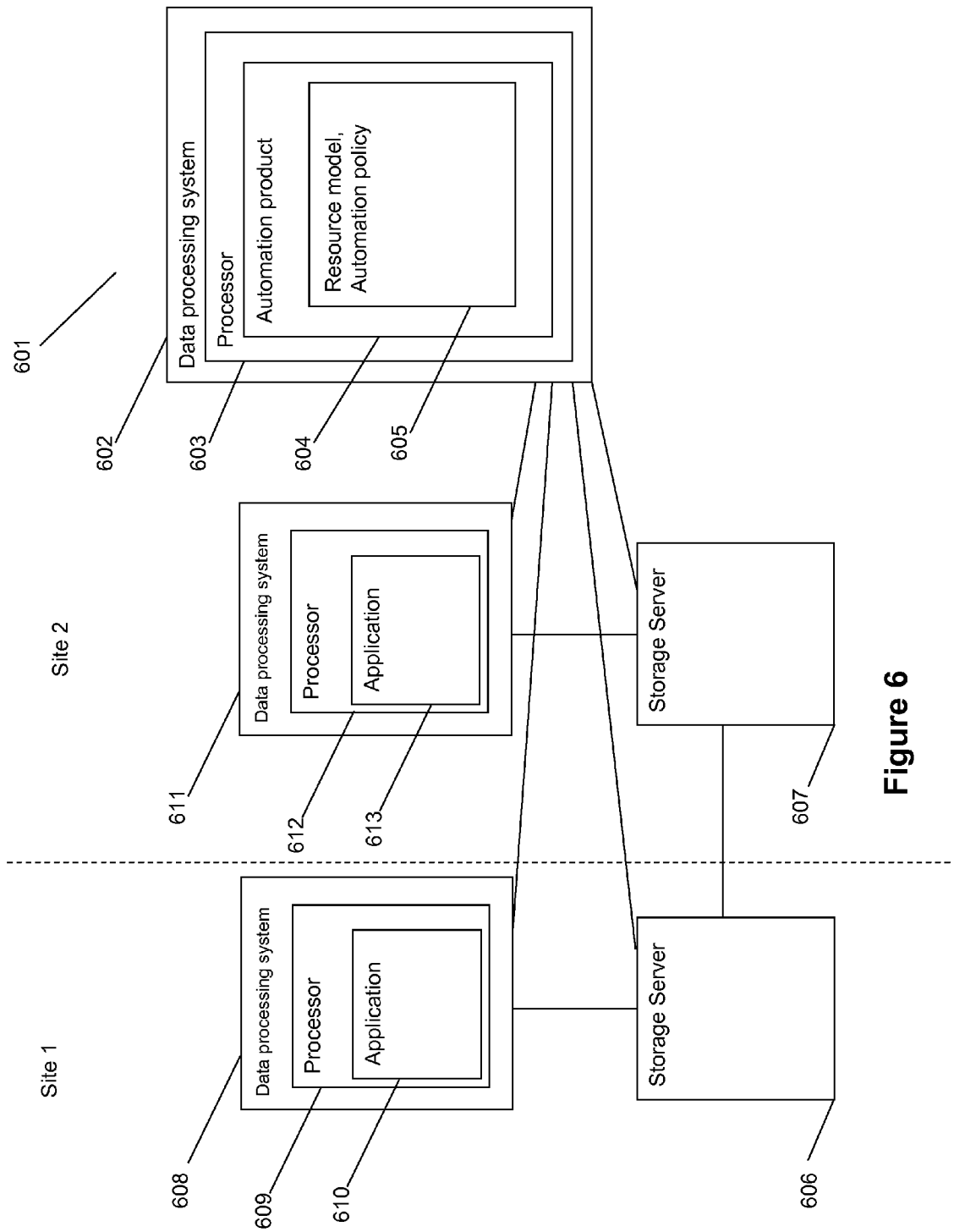
FIG. 6 illustrates a computer environment according to the invention.

FIG. 6 illustrates a computer system 601 used for changing the current replication direction of data copied from one storage system 606 to the other 607. The data is being used by applications 610 and 613 in a multi-site disaster recovery environment whereas the current runtime location of managed applications depends on the current replication direction.

The computer system 601 comprises a data processing system 602 that contains a processor 603. The processor runs an automation product 604, whose behavior is controlled via an automation policy 605. The computer system 601 controls the availability state (online or offline) of the applications 610 and 613 run by the processors 609 and 612 hosted by the data processing systems 608 and 611. The application 610 is dependent on data offered by the storage system 606, and the application 613 is dependent on data offered by the storage system 607.

FIG. 6 shows the physical view on a minimal disaster recovery setup. It consists of two sites site 1 and backup site 2. Both sites consist of a data processing system hosting the application and a storage server. The automation engine is located on a data processing system at site 2 for availability reasons. If site 1 has an outage, the automation engine survives and can process the site-takeover. If site 2 has an outage, the automation engine will fail, but this does not have impact on the production application located at site 1.

Figure 2:
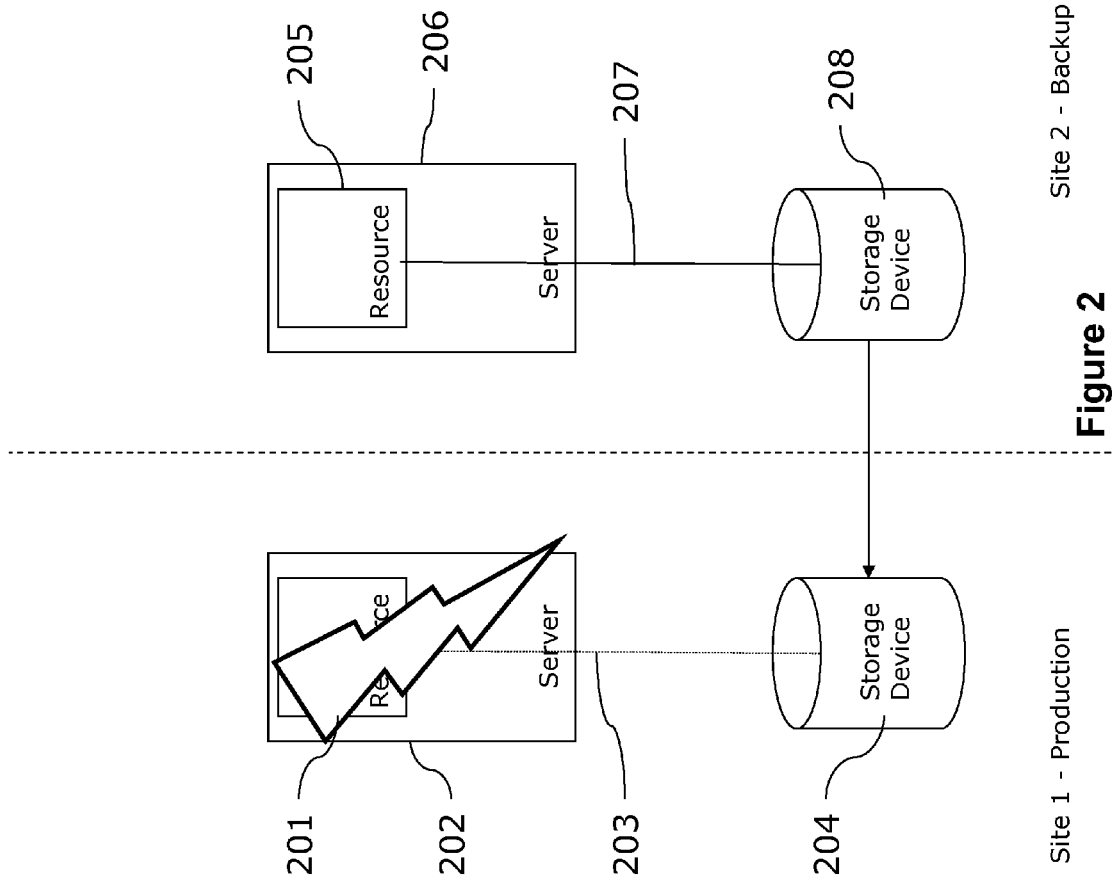
FIG. 2 illustrates a disaster recovery setup as on FIG. 1 with application resource running at backup site 2.

When the automation product is started, the automation engine loads the automation policy into the memory. The automation policy contains the description of all resources, their relationships and their default requests which are the initial automation goals. FIG. 4 represents such a policy. It is the abstract resource definition for the real resources depicted in FIGS. 1 and 2. Once the policy is loaded in the automation engine, it gets the resource model (605) which is constantly being updated by events and which is the basis for any automation decisions which are made by the automation engine. Note, that even though the resource model like that depicted in FIG. 4 consists of resources that are actually located at both sites, the resource model itself is located within the main memory of the automation engine (605).

Automation in this disaster recovery setup is not only restricted to site failovers. The workload of a site may be moved to the other site for maintenance on the data processing systems or the storage servers. Further, a fire drill is a possible automation scenario. It is the site-takeover without actual disaster to test and ensure the site-takeover process. Follow the sun is another automation scenario where the production application is moved to the site where it is needed the most.

The site-failover or other automation tasks may be initiated by an operator or a predefined script triggered by an external product or a chron job. Typically, in case of a disaster, the site-takeover is not triggered automatically, but human intervention is desired. The operator assesses the size of the disaster and the impact on the business and decides if a site-takeover is required.

Present invention introduces a new resource type—the "replication resource". For this new resource type the automation manager is able to manage the availability state and the direction, which influences the direction of the copying of data. With the new replication resource not only the availability state of a resource can be influenced but also the desired direction. The desired direction is an additional goal the automation software tries to achieve for the replication resource. The desired availability state of a replication resource is only reached, when the desired direction matches the observed direction.

The replication resource not only delivers events in case of a change in its availability state, but also whenever the status of desired data replication is changing, thus allowing the automation software to react on those changes as well. The automation software has the knowledge of how the replication direction can be changed when this is required. The automation product knows that a change of the direction is only allowed when the replication itself has been stopped. Therefore, the operator request to change the direction will cause the automation manager to first ensure an offline state of the replication resource before the replication direction is being turned.

Replication resources are defined as a new resource type in the automation policy. This allows for the use of existing policy concepts for the replication resource, like groups and relationships. Other already existing resources which represent applications can now define relationships to this replication resource under the consideration of the current replication direction.

The direction concept is also supported by further policy constructs, each integrating role with its specific automation means:
  A replication resource uses the direction to control the replication direction. If the direction is Site1-Site2, the replication is directed from site 1 to site 2, direction Site2-Site1 is vice-versa.
  Relationships can use the observed direction on the replication resource to control the desired state of the application resource.

The described concepts allow for a policy construct that will enable the automation product to ensure that the run-location of a resource is always in line with the replication direction. Furthermore, it will allow for a site switch that is automated and under full control of the automation product. A workflow as described in FIG. 3 can be fully executed by the automation product.

The benefit of present invention is twofold. On the one hand, the workflow that is required to reconfigure a replication to run in the opposite direction (stop/change direction/start) is automatically executed by the automation software. On the other hand, the automation product is aware of the inseparable connection between the application and the replicated data. This is achieved through a specific relationship called "StartableIfReplicationDirection_Site1-Site2", or "StartableIfReplicationDirection_Site2-Site1" respectively. If this relationship is used between a resource and a replication resource, the automation product will only allow the resource to be started if the direction of the corresponding replication is as specified in the relationship.

The capabilities of the present invention can be implemented in software, firmware, hardware or some combination thereof. In particular, as will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for processing a disaster recovery setup using a policy-based automation engine controlling at least two sites of a computing environment, the method comprising:
   running an application resource of a first site of the at least two sites to access a storage device of the first site, each of the at least two sites comprising a server with an application resource and a storage device for storing data of the application resource, wherein the application resource on a second site of the at least two sites is online;
   running a replication resource, the replication resource being central to and an intermediary between the first site and the second site and configured to control a replication of data between the storage device on the first site on which data from the running application resource on the first site are stored to the storage device on the second site;
   submitting a replication request to the automation engine for changing a replication direction to run from the second site to the first site, while the application resource and the replication resource on the first site are online;
   detecting a mismatch between the requested replication direction and an existing replication direction;
   in response to the detected mismatch, propagating offline input/output (I/O) requests to the application resource on the first site and the application resource on the second site respectively based on a highest priority of the offline I/O requests, and subsequently stopping the running of the application resource on the first site;
   stopping the running of the replication resource on the first site, after the stopping of the running of the application resource on the first site;
   changing the replication direction to run from the second site to the first site; and
   after changing the replication direction, removing the propagated offline I/O requests and starting the application resource in order of relationship, and running the replication resource on the second site; wherein the relationship is defined as one of a set of rules in the replication resource, and the replication resource on the second site is only commenced if the relationship of the replication direction between the first site and the second site is specified within the set of rules.

2. The method according to claim 1, wherein the automation engine is goal-driven by prioritizing requests on the application resources and the replication resource such that the resource replication request for changing the replication direction is given the highest priority.

3. The method according to claim 1, wherein the automation engine is event-driven by receiving events from controlled resources at a change of status to determine a final state of the application resources and the replication resource.

4. The method according to claim 1, wherein the application resource is defined with corresponding state of availability and relationship rules for constraints between the application resources of each site.

5. The method according to claim 1, wherein the replication resource is defined by an availability state and a replication direction state, the availability state and the replication direction state both being updated within the automation engine.

6. A computer system for a disaster recovery setup comprising:
   at least two sites each including a server, the server comprising a processing device for running an application resource and a storage device in communication with the processing device for storing data of the application resource, each of the application resources being defined with corresponding state of availability and relationship rules for constraints between the application resources, the computer system being controlled by a policy-based automation engine; and
   wherein the processing device performs controlling, by a replication resource being central to and an intermediary between a first site and a second site, a replication of data between the storage device of the first site on which data from a running application resource of the first site are stored to the storage device on the second site, the replication resource being defined by an availability state and a replication direction state, both the availability state and the replication direction state being updated within the automation engine and being defined by relationship rules between the replication resource and the application resources controlled by the automation engine to perform a change of replication direction after bringing to a stop the running application resource of the first site accessing the storage device of the first site, then bringing to a stop the running replication resource, executing a submission to the automation engine of a replication request for changing the replication direction from one site to another site by the automation engine taking into account the relationship rules, detecting a mismatch between the requested replication direction and an existing replication direction, in response to the detected mismatch, propagating offline input/output (I/O) requests to the application resource on the first site and the application resource on the second site respectively based on a highest priority of the offline I/O requests, and subsequently stopping the running of the application resource on the first site, stopping the running of the replication resource on the first site, after the stopping of the running of the application resource on the first site, changing replication direction to start from a storage device of the second site towards the storage device on the first site, and subsequent to the changing of the replication direction, removing the propagated offline I/O requests and starting the application resource in order of relationship, and the replication resource on the second site; wherein the relationship is defined as one of a set of rules in the replication resource, and the replication resource on the second site is only commenced if the relationship of the replication direction between the first site and the second site is specified within the set of rules.

7. The computer system according to claim 6, wherein the automation engine is goal-driven by prioritizing requests on the application resources and the replication resource such that the resource replication request for changing the replication direction is given the highest priority.

8. The computer system according to claim 6, wherein the automation engine is event-driven by receiving events from the resources at a change of status to determine final state of the application resources and the replication resource.

9. The computer system according to claim 6, further comprising a processor in communication with each site and configured to run the automation engine.

10. The computer system according to claim 6, wherein the first site comprises a production site.

11. The computer system according to claim 6, wherein the second site comprises a backup site.

12. The computer system according to claim 6, wherein each application resource further comprises a data processing server.

13. A computer program product for processing a disaster recovery setup using a policy-based automation engine controlling at least two sites of a computer system, the computer program product including a non-transitory computer readable storage medium comprising:
   computer code for stopping a running application resource of a first site of the at least two sites from accessing a storage device of the first site, each of the at least two sites comprising a server with an application resource and a storage device for storing data of the application resource wherein the application resource on a second site of the at least two sites is offline;
   computer code for bringing to a stop a running of a replication resource, the replication resource being central to and an intermediary between the first site and the second site and configured to control a replication of data between the storage device on the first site on which data from the running application resource on the first site are stored to the storage device on the second site;
   computer code for submitting a replication request to the automation engine for changing a replication direction to run from the second site to the first site;
   computer code for detecting a mismatch between the requested replication direction and an existing replication direction;
   computer code for, in response to the detected mismatch, propagating offline input/output (I/O) requests to the application resource on the first site and the application resource on the second site respectively based on a highest priority of the offline I/O requests, and subsequently stopping the running of the application resource on the first site;
   computer code for stopping the running of the replication resource on the first site, after the stopping of the running of the application resource on the first site;
   computer code for changing the replication direction to run from the second site to the first site; and
   computer code for, subsequent to the changing of the replication direction, removing the propagated offline I/O requests and starting the application resource in order of relationship, and the replication resource on the second site; wherein the relationship is defined as one of a set of rules in the replication resource, and the replication resource on the second site is only commenced if the relationship of the replication direction between the first site and the second site is specified within the set of rules.

14. The computer program product of claim 13, further comprising computer code for prioritizing requests on the application resources and the replication resource such that the resource replication request for changing the replication direction is given the highest priority.

15. The computer program product of claim 13, further comprising computer code for receiving events from controlled resources at a change of status to determine final state of the application resources and the replication resource.

16. The computer program product according to claim 13, further comprising computer code for associating the application resource with corresponding state of availability and relationship rules for constraints between the application resources of each site.

17. The computer program product according to claim 13, further comprising computer code for associating the replication resource with an availability state and a replication direction state, the availability state and the replication direction state both being updated within the automation engine.

* * * * *